United States Patent [19]

Hunger et al.

[11] Patent Number: 4,536,109
[45] Date of Patent: Aug. 20, 1985

[54] DRILL CHUCK FOR PERCUSSION DRILLING

[75] Inventors: Josef Hunger, Olching; Anton Neumaier, Fürstenfeldbruck, both of Fed. Rep. of Germany

[73] Assignee: The Standard Oil Company (Ohio), Cleveland, Ohio

[21] Appl. No.: 587,190

[22] Filed: Mar. 7, 1984

[30] Foreign Application Priority Data

Mar. 21, 1983 [DE] Fed. Rep. of Germany ....... 3310146

[51] Int. Cl.³ .............................................. B23B 31/12
[52] U.S. Cl. ..................................... 408/240; 279/60
[58] Field of Search ................................... 279/60–69, 279/93; 408/239, 239 A, 226, 240; 409/234; 173/93, 93.5, 97, 129; 175/203, 414

[56] References Cited

U.S. PATENT DOCUMENTS 3,737,170 6/1973 Wanner et al. ...................... 279/60
4,491,445 1/1985 Hunger et al. ..................... 279/60 X

FOREIGN PATENT DOCUMENTS 2451265 5/1976 Fed. Rep. of Germany ...... 175/414
2030485 4/1980 United Kingdom ................ 279/60

Primary Examiner—Eugene F. Desmond
Attorney, Agent, or Firm—Thomas P. Schur; Joseph G. Curatolo; Larry W. Evans

[57] ABSTRACT

A drill chuck usable in a drilling device capable of rotary or rotary-percussion drilling, includes radially adjustable clamping jaws with the clamping surfaces of the jaws directed inwardly towards the central axis of the chuck. Each clamping jaw has at least one projection extending radially inwardly from the clamping surface for engagement in correspondingly shaped recesses in the shank of a drilling tool insertable into the chuck. The clamping surfaces form guide surfaces for the drilling tool so that the drilling tool is adequately guided over large surfaces extending in the axial and circumferential directions in the chuck.

6 Claims, 3 Drawing Figures

DRILL CHUCK FOR PERCUSSION DRILLING

SUMMARY OF THE INVENTION

The present invention is directed to a drill chuck for use in a drilling device capable of rotary or rotary-percussion drilling, such as a hammer drill. The drill chuck has at least two radially adjustable clamping jaws with the clamping surfaces directed toward the central axis of the chuck. The clamping surfaces have a concave shape in the circumferential direction for contacting the outside shape of a drilling tool inserted into the chuck. The clamping jaws have projections extending inwardly from the clamping surfaces toward the central axis and guide surfaces are formed by the clamping surfaces extending in the axial direction for maintaining the drilling tool in the proper drilling position.

Drill chucks utilized in rotary or rotary-percussion drilling operation can operate under two fundamentally different clamping concepts. In one concept, used mainly in drill chucks for percussion drilling devices, the jaws are pressed radially against the shank of the drilling tool. The transmission of torque and, in part, also of percussion energy from the jaws to the tool is effected by a frictional interlock. The transmission of torque to the drilling tool by frictional engagement is limited. Another disadvantage of such an arrangement is that the entire chuck participates in the percussion transmission so that a major portion of the percussion energy is lost without use or is converted to heat.

In another concept, the drilling tool is guided within the chuck and has a certain axial mobility. Projections formed on the clamping jaws engage in a form-locking manner into recesses on the tool shank and serve to transmit the torque and to retain the tool from displacement in the axial direction. Percussion energy is transmitted directly to the shank of the tool. The chuck itself does not participate in the transmission of the percussion energy.

A known drill chuck includes clamping jaws with projections. In the direction toward the opening into the chuck located ahead of the projections, the clamping jaws form concavely shaped guide surfaces for the outside of the tool shank. The centering and guiding of the drilling tool occurs in the feed direction at the front or leading end of the clamping jaws. The length available for guiding the tool in this region of clamping jaws is very limited. Since the drilling tool must have a certain radial play for axial mobility relative to the guide surfaces, the tool may tilt in the chuck if the guide surface is small. Such tilting of the tool may result in the drilling tool bit deviating from the drilling axis by several millimeters.

Therefore, it is the primary object of the present invention to provide a drill chuck which assures proper guidance for the drilling tool.

In accordance with the present invention, adequate guidance for the drill tool is afforded by locating guide surfaces along opposite sides of the projections in the clamping jaws.

As a result, guide surfaces are arranged in pairs about the clamping jaw projections. Such an arrangement results in a uniform distribution of the bearing forces. The bearing forces in the region of the guide surfaces due to transverse loads on the drilling tool are substantially reduced as compared with a single guide surface. For proper guidance of drilling tools, the guide surfaces should be spaced apart as far as possible. Accordingly, the clamping jaws should have two guide surfaces spaced apart in the axial direction on opposite sides of the projection. With such an arrangement the guide surfaces afford a large distance between the bearing surfaces and result in relatively small bearing forces.

Further, it is advantageous if the clamping jaws have two guide surfaces extending in the circumferential direction and located on opposite sides of the projection. Accordingly, such guide surfaces extend parallel to the axial direction of the chuck. This arrangement affords a long guide length with large bearing surfaces on the clamping jaws for the drilling tool and thus a low compressive force applied to the area of the clamping surfaces. Due to the low pressure developed per unit of area, the wear which develops because of the relative motion between the drilling tool and the clamping jaws is greatly reduced.

For axial retention and the transmission of torque, in principle one projection on the clamping jaws is sufficient. For a more uniform pressure distribution at the surface serving to transmit the torque, it is preferable to provide two projections one spaced axially behind the other. Such an arrangement of the projections affords an additional guide surface between the projections. For operational effectiveness, however, the drilling tool must have two axially spaced recesses in its shank surface to receive the projections.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
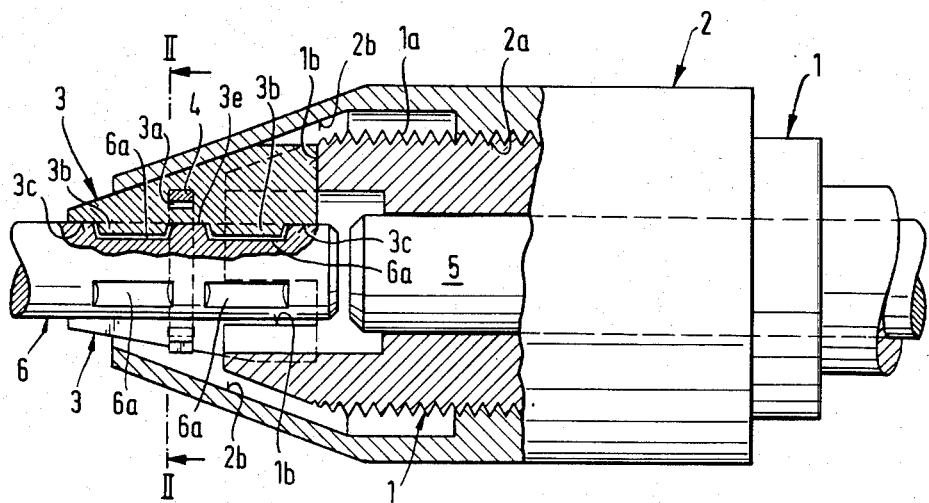
FIG. 1 is a side view, partly in section, of a drill chuck embodying the present invention with a drilling tool inserted into the chuck.
Figure 3:
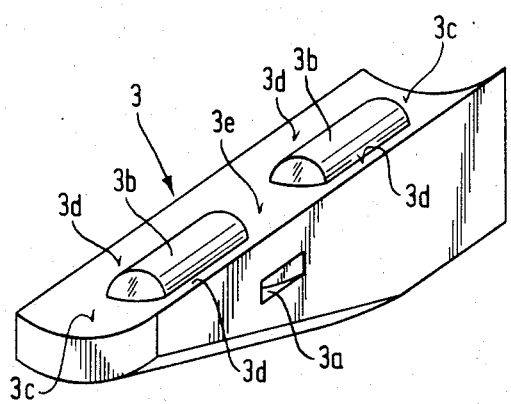
FIG. 3 is a perspective view of one of the clamping jaws illustrated in FIG. 1.

In FIG. 1 a drill chuck is illustrated including a chuck body 1 centered within a chuck sleeve 2 and with three radially displaceable clamping jaws 3 mounted in the front or leading end of the chuck body. As viewed in FIG. 1, the left-hand end of the drill chuck is the leading end and the right-hand end is the trailing end and this arrangement of the ends is also the same for the components making up the chuck. The leading end of the chuck body 1 and of the sleeve 2 is frusto-conically shaped so that both parts widen in the direction of the trailing end. From the trailing end of the frusto-conical sections to the trailing end of the chuck body 1 and the sleeve 2 the outer surfaces of both are generally cylindrically shaped. The cylindrically shaped portion of the chuck body 1 has a male thread 1a which is in threaded engagement with a female thread 2a located on the inside surface of the sleeve 2. By turning one of the chuck body 1 and the sleeve 2 relative to the other axial displacement of the chuck body and the sleeve is possible. As can be seen in FIGS. 1 and 3, each clamping jaw 3 has a circumferential extending opening 3a in which a ring spring 4 is seated. The ring spring 4 presses the jaws radially outwardly against the inside surface 2b of the frusto-conical portion of the sleeve 2. Clamping jaws 3 are mounted radially displaceable in slots 1b in the leading end of the chuck body. Further, an axially extending ram 5 is mounted along the central axis of the chuck within the chuck body 1 and the ram is axially displaceable. Ram 5 serves to transmit percussion energy to the shank end of a drilling tool 6 inserted into the chuck. The shank end 6 of the drilling tool is provided with axially extending recesses 6a which are shaped complementary to the projections 3b on the clamping jaws so that the projections fit into the recesses. As can be seen in FIG. 3, in the circumferential direction the clamping surface of the jaws 3 has a concave shape. The guide surfaces 3c formed in the clamping surface of each clamping jaw 3 is located contiguous to one of the projections 3b. As can be seen in FIG. 1, the guide surfaces 3c are at the leading end of the jaw adjacent to the projection 3b closer to the leading end and the other guide surface 3c are at the trailing end of the clamping jaw adjacent the trailing end of the second projection 3b.

Figure 2:
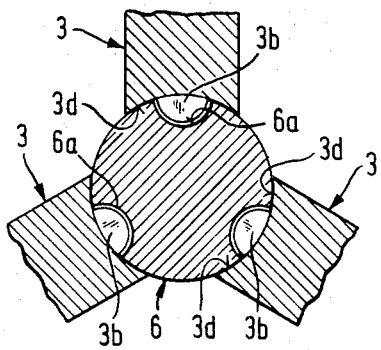
FIG. 2 is a transverse sectional view through the drill chuck in FIG. 1, taken along the line II—II.

In the enlarged transverse section shown in FIG. 2, the clamping surface of the jaws 3 are shown in bearing contact with the outside surface of the shank end 6 of the drilling tool and the projections 3b fit in a form-locking manner into the recesses 6a in the shank end. In addition to the circumferentially extending guide surfaces 3c, the clamping jaws have axially extending guide surfaces 3d extending along and outwardly from the projections in the axial direction of the chuck. The combination of the guide surfaces 3c, 3d afford a good guiding and centering action for the shank end 6 of the drilling tool. To avoid exact geometrical coincidence, the projections 3b on the clamping jaws 3 have a certain radial play relative to the recesses 6a in the shank 6. The guide surfaces 3d fit closely to the shank diameter to be clamped in the chuck. Shank diameters of the drilling tool which differ from this nominal diameter lead to a reduction in the guide surfaces of the clamping jaws with the surface of the shank 6.

In the perspective view of the clamping jaw 3 displayed in FIG. 3, the passage or opening 3a for the spring ring 4 can be noted. The spring ring 4 presses the jaws 3 radially outwardly against the inside surface of the sleeve 2. The inside or clamping surface of the jaw 3 is shown facing upwardly with the two axially extending projections 3b spaced apart. In the operative position, the projections 3b extend toward the central axis of the chuck. In FIG. 3 the guide surfaces 3c are adjacent to one end of each projection 3b and extend from the projection in the axial direction. Conversely, the other guide surfaces 3d extend in the axial direction along the opposite sides of the projections 3b and extend away from the projection in the circumferential direction, that is, the direction in which the clamping surfaces of the jaw is concavely shaped. In addition, another guide surface 3e is located between the adjacent ends of the projections 3b. Guide surfaces 3c, 3d and 3e form a continuous clamping surface in combination with the projections and the clamping surface is concave transversely of the axial direction of the chuck. The corresponding outside surface of the shank end 6 of the drilling tool is guided along the combined guide surfaces 3c, 3d and 3e of the clamping jaw. Due to such a combination of guide surfaces, the load per unit area and, as a result, the wear on the clamping jaws 3 as well as on the shank 6 of the drilling tool is very low. In place of the two projections 3b illustrated in the drawings, a single projection 3b could be provided on each of the clamping jaws. While the projections 3b are rounded, angular projections could be used, such as projections with a triangular, a rectangular or a trapezoidally shaped transverse cross-section.

By rotating one of the sleeve 2 and the chuck body 1 relative to the other the inwardly directed force on the clamping jaws can be released so that the spring ring 4 biases the jaws out of engagement with the shank 6 of the drilling tool so that the tool can be removed. After another tool is inserted into the chuck, the reverse movement of the sleeve and the chuck will provide an inwardly directed force against the clamping jaws 3 so that they move into clamping engagement with the shank 6 of the tool.

While specific embodiments of the invention have been shown and described in detail to illustrate the application of the inventive principles, it will be understood that the invention may be embodied otherwise without departing from such principles.

We claim:

1. Chuck for a drilling device for use as a rotary drilling device or a rotary/percussion device, such as a hammer drill, comprising means forming a chuck housing having a central axis and arranged to receive the shank of a drilling tool removably mounted in said chuck and extending generally along the central axis, clamping jaws radially adjustably mounted in said chuck housing means and arranged to be circumferentially spaced apart around the shank of the drilling tool, each said clamping jaw has a radially inwardly facing clamping surface shaped concavely in the circumferential direction around the central axis, at least one projection on each said clamping jaw extending radially inwardly from said clamping surface, said projections extending in the axial direction of the central axis and arranged to engage in recesses in the shank of the drilling tool, wherein the improvement comprises that the clamping surface of each clamping jaw has first guide surfaces extending in the axial direction along the opposite axial extending sides of said projection and at least one second guide surface section extending transversely of the axial direction of the central axis along one of the ends of said projection spaced apart in the axial direction of the chuck.

2. Chuck for a drilling device as set forth in claim 1, wherein each said clamping jaw has two said second guide surface sections spaced apart from one another in the axial direction of said chuck.

3. Chuck for a drilling device as set forth in claim 1 or 2, wherein said first guide surface sections extend in the circumferential direction outwardly from each of the opposite axially extending sides of said projections.

4. Chuck for a drilling device as set forth in claim 1 or 2, wherein each said clamping jaw has a pair of said projections spaced apart in the axial direction of said chuck with a third guide surface section extending between the adjacent spaced ends of said projections.

5. Chuck for a drilling device as set forth in claim 1, wherein said chuck housing means comprise a central chuck body and a sleeve laterally encircling said chuck body, said chuck body in said sleeve being in axially adjustable threaded engagement, said chuck body having slots therein, said clamping jaws adjustably mounted in said slots, each of said clamping jaws has an opening therein extending in the circumferential direction of said chuck, a spring ring mounted in the openings through said clamping jaws for biasing said clamping jaws radially outwardly against said sleeve and said clamping jaws equiangularly spaced apart around the central axis of said chuck.

6. Chuck for a drilling device as set forth in claim 5, wherein said projections extending in the axial direction of said chuck have a rounded configuration in the circumferential direction around the central axis.

* * * * *

UNITED STATES PATENT AND TRADEMARK OFFICE
CERTIFICATE OF CORRECTION

PATENT NO. : 4,536,109

DATED : August 20, 1985

INVENTOR(S) : Josef Hunger, et al

It is certified that error appears in the above-identified patent and that said Letters Patent is hereby corrected as shown below:

In the heading of the Patent it should read:

-- [73] Assignee: Hilti Aktiengesellschaft,
Fürstentum Liechtenstein

Attorney, Agent or Firm - Toren, McGeady, Stanger, Goldberg and Kiel P.C. --

Signed and Sealed this

Eleventh Day of March 1986

[SEAL]

Attest:

DONALD J. QUIGG

Attesting Officer

Commissioner of Patents and Trademarks